US006826915B2

(12) United States Patent
Wada et al.

(10) Patent No.: US 6,826,915 B2
(45) Date of Patent: Dec. 7, 2004

(54) MAGNETIC REFRIGERANT MATERIAL, REGENERATOR AND MAGNETIC REFRIGERATOR

(75) Inventors: Hirofumi Wada, Uji (JP); Satoshi Hirosawa, Otsu (JP)

(73) Assignee: Meomax Co., Ltd., Okada (JP)

( * ) Notice: Subject to any disclaimer, the term of this patent is extended or adjusted under 35 U.S.C. 154(b) by 83 days.

(21) Appl. No.: 10/381,009

(22) PCT Filed: Feb. 12, 2002

(86) PCT No.: PCT/JP02/01160

§ 371 (c)(1),
(2), (4) Date: Mar. 20, 2003

(87) PCT Pub. No.: WO03/009314

PCT Pub. Date: Jan. 30, 2003

(65) Prior Publication Data

US 2004/0093877 A1 May 20, 2004

(51) Int. Cl.[7] .............................................. F25B 21/00
(52) U.S. Cl. ......................................................... 62/3.1
(58) Field of Search .......................... 62/3.1, 114, 467; 252/67

(56) References Cited

U.S. PATENT DOCUMENTS

| | | | | |
|---|---|---|---|---|
| 4,849,017 A | * | 7/1989 | Sahashi et al. ................ | 75/245 |
| 5,641,424 A | * | 6/1997 | Ziolo et al. .................... | 252/67 |
| 5,743,095 A | * | 4/1998 | Gschneidner et al. ......... | 62/3.1 |
| 5,887,449 A | * | 3/1999 | Pecharsky et al. ............. | 62/3.1 |
| 5,934,078 A | | 8/1999 | Lawton, Jr. et al. | |
| 6,293,106 B1 | * | 9/2001 | Acharya et al. ............... | 62/3.1 |

FOREIGN PATENT DOCUMENTS

EP       0 400 263       12/1990

OTHER PUBLICATIONS

Materia, vol. 39, No. 11, pp. 909–915, Nov. 2000, "Magnetocaloric Effect of Compounds Showing First Order Phase Transition (A Research of High–Efficiency Magnetic Refrigeration)", Hirofumi Wada et al.
Appl. Phys. Lett, 70(24), pp. 3299–3301, Jun. 1997, "Tunable Magnetic Regenerator Alloys with a Giant Magnetocaloric Effect for Magnetic Refrigeration from ~20 to ~290 K", V.K. Percharsky et al.
Phys. Stat. Sol. (a)91, pp. 105–113, Jun. 1985, "Magnetic B–T Phase Diagram of Anion Substituted MnAs Magnetocaloric Experiments", Ch. Khurt et al.
Journal of Alloys and Compounds, 178, pp. 237–247, 1992, "Specific Heat Capacity of $Mn_{1+A}As1-x$ Sbx Single Crystals", J.–W.Schünemann et al.
Physics Letters. 91A, No. 5, pp. 243–245, Sep. 1982, "Magnetic Phase Diagram of MnAs Effect of Magnetic Field on Structural and Magnetic Transitions", A. Zieba et al.
P.A. Lane et al., "Metalorganic Chemical Vapour Deposition of Manganese Arsenide Amtimonide for thin Film Magnetic Applications", Journal of Crystal Growth, North–Holland Publishing Co., Amsterdam, NL, vol. 153, No. ½, Aug. 1995, pp. 25–30.
C. Guillaud; "Transformation Points of Definite Compounds of MnAs, MnBi in Relation with a Probable Antiferromagnetic Mechanism"; Le Journal de Physique et le Radium; Tome 12; Mar. 1951; pp. 223–227.

* cited by examiner

Primary Examiner—Henry Bennett
Assistant Examiner—Malik N. Drake
(74) Attorney, Agent, or Firm—Keating & Bennett, LLP

(57) ABSTRACT

A magnetic refrigerant material exhibits sufficiently great magnetocaloric effect at or near room temperature. The magnetic refrigerant material has an NiAs type hexagonal structure in a ferromagnetic phase. The magnetic refrigerant material includes a first element Mn, a second element As and a third element to substitute for a portion of the second element, and exhibits a magnetic phase transition in a temperature range from about 230 K to less than about 318 K.

16 Claims, 9 Drawing Sheets

MAGNETIC REFRIGERANT MATERIAL, REGENERATOR AND MAGNETIC REFRIGERATOR

BACKGROUND OF THE INVENTION

1. Field of the Invention

The present invention generally relates to a magnetic refrigerant material. More particularly, the present invention relates to a magnetic refrigerant material that exhibits a sufficiently great magnetocaloric effect near or at room temperature, and also relates to a regenerator and a magnetic refrigerator that use the magnetic refrigerant material.

2. Description of the Related Art

Conventional refrigeration technology has often utilized the adiabatic expansion or the Joules-Thomson effect of a gas. However, such gas compression technology has some drawbacks. Firstly, a chlorofluorocarbon (CFC) gas, a typical refrigerant working material used most commonly in this technology, damages the ozone layer, which makes this material environmentally hazardous. Secondly, the gas compression technology always results in low efficiency, thus constituting a huge obstacle to the desired energy saving. To solve these problems, a method that takes advantage of entropy change accompanied by the magnetic phase transition (which is also termed "magnetic transformation") of a solid has been researched as a high-efficiency refrigeration technique. In the magnetic refrigeration technique, cooling is effected by using a change in temperature resulting from the entropy change of a magnetic material. More specifically, a magnetic material used in this method alternates between a low magnetic entropy state with a high degree of magnetic orientation, which is created by applying a magnetic field to the magnetic material near its Curie temperature, and a high magnetic entropy state with a low degree of magnetic orientation (e.g., randomly oriented state), which is created by removing the magnetic field from the magnetic material. A property like this is called "magnetocaloric effect" and a magnetic refrigerator, which uses a material exhibiting the magnetocaloric effect (which will be herein referred to as a "magnetocaloric material") as its magnetic refrigerant material or regenerative material, has been researched and developed vigorously.

A known magnetocaloric material (e.g., metallic gadolinium (Gd)) exhibits a second order phase transition. Such a material exhibits the magnetocaloric effect in a relatively broad temperature range, but the magnitude of the magnetocaloric effect is relatively small. Accordingly, to achieve cooling power at a practical level, a high magnetic field as strong as 5 T (tesla) or more, which can be generated only by a superconducting magnet, for example, must be applied to the magnetic material. Therefore, a large quantity of energy is consumed to apply that strong magnetic field. That is to say, the desired reduction in energy consumption, which should be one of the major advantages of the magnetic refrigeration technique, is not realizable by this magnetic material alone.

On the other hand, a magnetocaloric material, which exhibits a first order transition from a ferromagnetic phase into a paramagnetic phase at its Curie temperature, exhibits the magnetocaloric effect in a relatively narrow temperature range. However, the magnitude of the magnetocaloric effect is relatively great. Accordingly, such a material is the object of much attention because it is highly likely that the material can be used in a regenerator or a magnetic refrigerator that operates on the application of a magnetic field generated by a permanent magnet. See, for example, *Materia*, Vol. 39, No. 11, pp. 909–915, November 2000, "Magnetocaloric Effect of Compounds Showing First Order Phase Transition (A Research of High-Efficiency Magnetic Refrigeration)", Hirofumi Wada et al. More particularly, it was recently discovered that an intermetallic compound $Gd_5 (Si_xGe_{1-x})_4$ (where $x \leq 0.5$) shows a first order magnetic phase transition at a temperature that is near room temperature and the compound is now believed to potentially provide a regenerator and a magnetic refrigerator that can operate at room temperature. See, for example, V. K. Pecharsky et al., Appl. Phys. Lett., 70, pp. 3299–3301 (1997).

However, even if the intermetallic compound is used, it is still necessary to apply a strong magnetic field to realize cooling power at a practical level. Thus, there is a growing demand for a material that exhibits an even greater magnetocaloric effect.

SUMMARY OF THE INVENTION

In order to overcome the problems described above, preferred embodiments of the present invention provide (1) a magnetic refrigerant material that exhibits sufficiently great magnetocaloric effect at or near room temperature and (2) a regenerator and a magnetic refrigerator using such a magnetic refrigerant material.

A magnetic refrigerant material according to a preferred embodiment of the present invention preferably has an NiAs type hexagonal structure in a ferromagnetic phase. The material includes a first element Mn, a second element As and a third element to substitute for a portion of the second element. In addition, the magnetic refrigerant material exhibits a magnetic phase transition in a temperature range from about 230 K to less than about 318 K.

In one preferred embodiment of the present invention, the third element is preferably Sb. Optionally, the magnetic refrigerant material may also include a fourth element.

Specifically, the magnetic refrigerant material is preferably represented by the general formula $MnAs_{1-x}Sb_x$ (where $0 < x \leq 0.25$) and preferably exhibits the magnetic phase transition into the ferromagnetic phase substantially without undergoing a structural transformation when a magnetic field is applied to the material in a paramagnetic phase. More particularly, x is preferably equal to or greater than about 0.015, more preferably equal to or greater than about 0.05.

In this particular preferred embodiment, the material may exhibit the magnetic phase transition upon the application of a magnetic field of about 4 T (tesla) or less.

A regenerator according to another preferred embodiment of the present invention preferably includes first and second regenerative beds, each including the magnetic refrigerant material according to any of the preferred embodiments of the present invention described above, and a mechanism for applying mutually different magnetic fields to the first and second regenerative beds.

In one preferred embodiment of the present invention, each of the first and second regenerative beds may include a plurality of magnetic refrigerant materials that exhibit the magnetic phase transition at respectively different temperatures.

Specifically, the magnetic refrigerant materials may form multiple layers that are stacked one upon another.

In another preferred embodiment of the present invention, each of the first and second regenerative beds may include the magnetic refrigerant material and a binder. In that case, the binder may preferably be Al, Cu or Ti. Alternatively, the binder may also be a mixture or alloy that includes two or more elements selected from the group consisting of Al, Cu and Ti, or other suitable material.

In still another preferred embodiment, the mechanism for applying the magnetic fields may include a magnetic circuit including a permanent magnet.

More particularly, the magnetic circuit may variably control the strengths of the magnetic fields to be applied to the first and second regenerative beds.

Alternatively, the regenerator may further include a mechanism for shuttling the first and second regenerative beds back and forth between a first position, which is inside the magnetic field created by the permanent magnet, and a second position, which is outside of the magnetic field, thereby applying the mutually different magnetic fields to the first and second regenerative beds.

A regenerator according to still another preferred embodiment of the present invention preferably includes a magnetic circuit for variably controlling the strength of a magnetic field generated therefrom inside a cylindrical space, and a regenerative bed, which is disposed and fixed inside the cylindrical space and includes the magnetic refrigerant material according to any of the preferred embodiments of the present invention described above.

A magnetic refrigerator according to still another preferred embodiment of the present invention preferably includes the regenerator according to any of the preferred embodiments of the present invention described above, and a cold-side heat exchanger and a hot-side heat exchanger that are thermally coupled to the regenerator.

Other features, elements, characteristics and advantages of the present invention will become more apparent from the following detailed description of preferred embodiments thereof with reference to the attached drawings.

BRIEF DESCRIPTION OF THE DRAWINGS

FIG. 7 is a graph showing how the Curie temperature T$_c$ of MnAs$_{1-x}$Sb$_x$ (where 0≦x≦0.40) changes with the mole fraction x of Sb substituted for As.

DETAILED DESCRIPTION OF PREFERRED EMBODIMENTS

Figure 1:
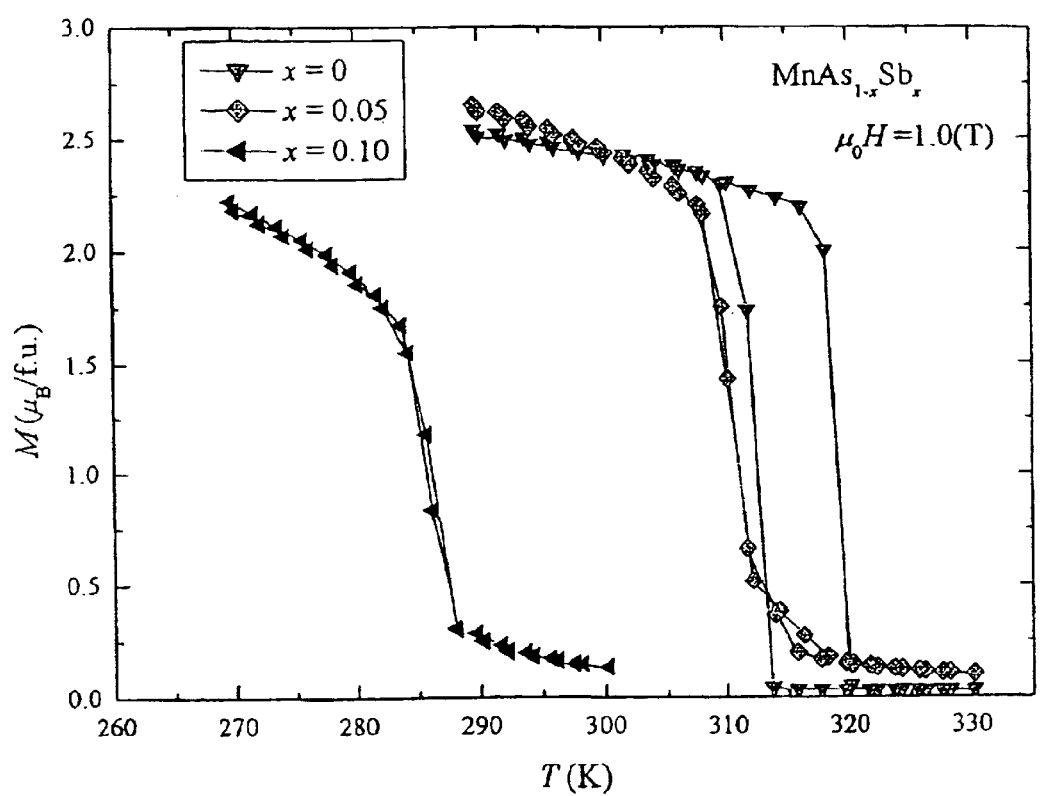
FIG. 1 is a graph showing exemplary magnetization (M)-temperature (T) curves of MnAs and MnAs$_{1-x}$Sb$_x$ (where x=0.05 and 0.10).

The present inventors performed intensive research concerning the magnetic phase transition of MnAs that exhibits a first order transition from a ferromagnetic phase into a paramagnetic phase. As a result, the present inventors discovered that a material, obtained by substituting a third element for a portion of As included in MnAs, has a Curie temperature, and exhibits sufficiently great magnetocaloric effect, at or near room temperature, and that the Curie temperature is controllable in a broad range by modifying the composition. Preferred embodiments of the present invention were developed based on this discovery.

A magnetic refrigerant material according to various preferred embodiments of the present invention has an NiAs type hexagonal structure in its ferromagnetic phase. The material includes a first element Mn, a second element As and a third element that may be substituted for a portion of the second element, and exhibits a magnetic phase transition in a temperature range from about 230 K to less than about 318 K. Thus, the magnetic refrigerant material according to various preferred embodiments of the present invention is effectively applicable to regenerators and magnetic refrigerators that have an operating temperature range at or near room temperature. Examples of those regenerators and magnetic refrigerators include refrigerators, freezers and air conditioners. The third element is preferably Sb. Optionally, the magnetic refrigerant material may also include a fourth element.

At its Curie temperature of about 318 K, MnAs exhibits a "meta-magnetic" phase transition from a ferromagnetic phase into a paramagnetic phase while undergoing a structural transformation from an NiAs type hexagonal structure into an MnP type orthorhombic structure. That is to say, MnAs exhibits a first order magnetic phase transition and a large magnetocaloric effect. However, the magnetic phase transition of MnAs is accompanied by the structural transformation as described above. Accordingly, MnAs shows hysteresis in its magnetization (M)-temperature (T) curve. For that reason, it is difficult to use MnAs as a magnetic refrigerant material.

In contrast, the present inventors discovered that if a portion of As included in MnAs is replaced with a third element, then the application of a magnetic field to the material in its paramagnetic phase allows the material to exhibit a magnetic phase transition into a ferromagnetic phase substantially without undergoing a structural transformation. In addition, although this is a second order magnetic phase transition, that material can exhibit almost as great magnetocaloric effect as MnAs. That is to say, the material, obtained by substituting the third element for As in MnAs, shows no temperature hysteresis during its magnetic phase transition. Thus, this material is effectively applicable as a magnetic refrigerant material.

Furthermore, the present inventors regulated the Curie temperature of that material by changing the mole fraction of the third element (i.e., the amount of the second element that is replaced with the third element), thereby specifying a preferred mole fraction range that ensures a sufficiently great magnetocaloric effect.

When a magnetic field is applied thereto, a magnetic refrigerant material, represented by the general formula MnAs$_{1-x}$Sb$_x$ (where 0<x≦0.25), for example, exhibits a magnetic phase transition from a paramagnetic phase into a ferromagnetic phase substantially without undergoing a structural transformation. The Curie temperature of this material is from about 230 K to less than about 318 K. To substantially eliminate the temperature hysteresis accompanied by the structural transformation, the mole fraction x is preferably equal to or greater than about 0.015, more preferably equal to or greater than about 0.05.

In preferred embodiments of the present invention, the Curie temperature of a magnetic refrigerant material is controllable just by modifying the mole fraction of the third element such as Sb to substitute for a portion of the second element. Thus, a magnetic refrigerant material with any arbitrary composition can be easily provided depending on the intended application of a regenerator or magnetic refrigerator. Also, the Curie temperature of the known magnetic refrigerant material $Gd_5(Si_xGe_{1-x})_4$ changes relatively steeply in accordance with a variation in the mole fraction x of Si. Accordingly, it is not easy to control the Curie temperature of that material precisely enough. In other words, just a narrow composition variation range is allowed to realize a desired characteristic (e.g., Curie temperature). In contrast, when $MnAs_{1-x}Sb_x$ is used, the Curie temperature thereof is precisely controllable by modifying the mole fraction x of Sb and a broad composition variation range is allowed to obtain a desired characteristic. Thus, if multiple magnetic refrigerant materials, having mutually different Sb mole fractions in their compositions $MnAs_{1-x}Sb_x$ and respectively different Curie temperatures, are used in combination, a regenerative bed, exhibiting the magnetocaloric effect in a broad temperature range, can be provided. As used herein, the "regenerative bed" refers to a member provided for a regenerator so as to be filled with the magnetic refrigerant material and effect the regeneration by utilizing its magnetocaloric effect. That is to say, the "magnetic refrigerant material" refers to the material itself, while the "regenerative bed" refers to a component of the regenerator.

Furthermore, the magnetic refrigerant material according to preferred embodiments of the present invention (e.g., $MnAs_{1-x}Sb_x$ (where $0<x\leq0.25$)) exhibits the magnetic phase transition even upon the application of a magnetic field as low as 4 T (tesla) or less. Accordingly, unlike the conventional technique, no strong magnetic field is needed and a regenerator that can operate even upon the application of a magnetic field created by a permanent magnet is provided. Moreover, such a regenerator or magnetic refrigerator needs no electric power to generate the magnetic field, and effectively contributes to reduction in energy consumption.

Furthermore, the magnetic refrigerant material according to preferred embodiments of the present invention requires no rare earth elements, and is available at a relatively low price. In addition, even when an aqueous fluid is used as a heat transfer medium, there is no concern about corrosion.

The magnetic refrigerant material according to preferred embodiments of the present invention may be prepared in the following manner. In the following specific preferred embodiment of the present invention, Sb is preferably used as the third element to substitute for a portion of As in MnAs.

First, to obtain $MnAs_{1-x}Sb_x$ having a desired composition, Mn, As and Sb are introduced into a reactor (e.g., quartz tube), which is then evacuated to a vacuum of about 1 Pa or less, for example, and sealed hermetically. The vacuum inside the reactor should not exceed about 1 Pa. This is because a harmful substance such as arsenious acid may be produced at more than about 1 Pa by the chemical reaction of oxygen, for example, remaining in the reactor. The materials Mn, As and Sb may be in the powder form, for example.

Next, the reactor is heated to, and maintained at, a temperature between about 600° C. and 1,000° C. Then, As vaporizes and the inside of the reactor is filled with the vapor As, thereby producing a chemical reaction among the powder Mn, the powder Sb and the vapor As. This processing step will be herein referred to as a "baking process step". In the present preferred embodiment, the baking process step is carried out preferably at a temperature of about 600° C. to about 1,000° C. for approximately 24 to approximately 500 hours. This is because if the baking time (or reaction time) was shorter than about 24 hours, then the reaction might be incomplete. But if the baking process step was performed for more than about 500 hours, the productivity would decline.

After this baking process step has been performed, the reactor is cooled to approximately room temperature and the resultant cake (i.e., reactant) is unloaded. Thereafter, the cake is preferably pulverized and then further baked at a temperature of about 600° C. to about 1,000° C. By performing this re-baking process step, the composition distribution of $MnAs_{1-x}Sb_x$ in the cake can be made uniform and the Curie temperature distribution of the cake can be narrowed.

Subsequently, the cake of $MnAs_{1-x}Sb_x$ obtained in this manner is processed into a desired shape to make a regenerative bed. For example, the cake may be either shaped into a film, plate, layer or any other desired shape or further pulverized finely if necessary to obtain a powder of Mn $As_{1-x}Sb_x$. To allow a heat transfer fluid to pass through the magnetic refrigerant material inside the regenerative bed smoothly enough, the $MnAs_{1-x}Sb_x$ powder preferably has approximately spherical particles with a mean particle size of about 50 μm to about 300 μm. Also, the $MnAs_{1-x}Sb_x$ may be mixed with any other arbitrary material to form a composite material. In any case, the material may have any appropriate shape as long as the material allows for efficient heat exchange with external members.

A regenerator according to another preferred embodiment of the present invention includes first and second regenerative beds, each including the magnetic refrigerant material according to any of the preferred embodiments described above, and a mechanism for applying mutually different magnetic fields to the first and second regenerative beds. Thus, a regenerator, which operates at or near room temperature and ensures significant energy saving, is provided. By using the two regenerative beds in combination, the regenerator can operate even more efficiently.

Preferably, each of the first and second regenerative beds includes a plurality of magnetic refrigerant materials that have mutually different Curie temperatures (i.e., magnetic phase transition temperatures). Then, the regenerator may operate in a broader temperature range. Optionally, each of the regenerative beds may have a configuration in which the magnetic refrigerant materials having mutually different Curie temperatures are configured to define multiple layers that are stacked one upon another. Only the magnetic refrigerant material may be processed into a film shape. Alternatively, a metal having high ductility (e.g., one of Al, Cu and Ti or a mixture or alloy that includes at least two of Al, Cu and Ti) may be used as a binder, and the powder of the magnetic refrigerant material and the binder may be molded together. Among other things, aluminum is particularly usable as a high-ductility metal. This is because aluminum can be extruded at a low temperature and has a high thermal conductivity. It should be noted that a composite of the magnetic refrigerant material and the binder or any other suitable additive will be herein referred to as a "composite magnetic refrigerant material".

The molding process may be carried out by a cold or hot extrusion or rolling method. The molded material may have any shape that is suitable for heat exchange. For example, the molded material may have a film shape, a shape having a wide surface area with fins, or a tube shape, or other suitable shape. The extrusion method is particularly suitable for forming the molded material into a desired shape. This is because the material may be efficiently processed by the extrusion technique to have a complex cross-sectional shape.

It is naturally possible to make the regenerative bed by filling a container with the powder of the magnetic refrigerant material itself. Where the regenerative bed is formed as a stack of multiple magnetic refrigerant material layers, heat is exchanged with the magnetic refrigerant materials by making a heat transfer fluid flow in a direction that is substantially parallel to the direction in which those layers are stacked (i.e., vertically to the layer planes) inside the regenerative bed. As the heal transfer fluid, a liquid with a large specific heat such as water or aqueous antifreeze is preferably used. Accordingly, the regenerative bed is preferably filled with the powders so that the gap between the powder particles is wide enough to allow the fluid to pass easily. Thus, to prevent the particles of the respective layers, including the magnetic refrigerant materials having mutually different compositions, from moving along with the heat transfer fluid inside the regenerative bed, those layers are preferably partitioned from each other by a mesh having openings smaller in size than the particles. Likewise, each of the fluid inlet and outlet ports of the regenerative bed is also preferably provided with a mesh filter.

The magnetic refrigerant material (or the composite magnetic refrigerant material) is placed in a space with a variable magnetic field. Accordingly, the material preferably has no electrical conduction in the direction that is substantially perpendicular to that of the magnetic field. Should the material have electrical conduction that acts in a direction that is substantially perpendicular to the magnetic field, Joule heat would be generated due to an eddy current, thereby decreasing the cooling efficiency considerably. For that reason, a container to store the magnetic refrigerant material (or the composite magnetic refrigerant material) is preferably made of an insulator like a resin (e.g., polyethylene, PET or epoxy resin) or other suitable material. Where the regenerative bed is formed simply by filling a container with the powder of the magnetic refrigerant material, the meshes to be provided as partitions for preventing the powder particles from moving along with the heat transfer fluid unintentionally are also preferably made of an insulator.

The mechanism for applying the magnetic fields to the first and second regenerative beds of the regenerator according to preferred embodiments of the present invention is preferably a magnetic circuit including a permanent magnet. By using the permanent magnet, the regenerator can save much more energy and yet can have a greatly reduced size as compared to a superconducting magnet.

As the magnetic circuit for generating the magnetic fields to be applied to the first and second regenerative beds, two Halbach type magnetic circuits may preferably be used. In that case, magnetic fields having mutually different strengths are applicable to the first and second regenerative beds without moving them. In addition, when two Halbach type magnetic circuits are used, the overall magnetic field strength may be arbitrarily increased or decreased with the magnetostatic energy kept constant. Thus, a regenerator resulting in extremely small energy loss can be provided. It should be noted that the magnetic fields having mutually different strengths may include a substantially zero magnetic field.

Alternatively, the regenerator may further include a mechanism for shuttling the first and second regenerative beds back and forth between a first position, which is inside the magnetic field created by the permanent magnet, and a second position, which is outside of the magnetic field, thereby applying the mutually different magnetic fields to the first and second regenerative beds. As such a configuration, the active magnetic regenerator disclosed in U.S. Pat. No. 5,934,078 may be used, for example. If a permanent magnet is used to generate the magnetic field, a magnetic field gradient that is steeper than that created by a superconducting magnet may be formed. Accordingly, in that situation, even if the first and second regenerative beds are reciprocated for a shorter distance, magnetic fields having sufficiently different strengths are applicable to these beds. As a result, the regenerator can be downsized advantageously.

By providing the regenerator according to any of the preferred embodiments of the present invention described above and cold-side and hot-side heat exchangers that are thermally coupled to the regenerator, a high-efficiency magnetic refrigerator, which operates at or near room temperature, is achieved. The known configuration (e g., that disclosed in U.S. Pat. No. 5,934,078 identified above) may be used to remove heat from the regenerator.

Hereinafter, various examples of preferred embodiments of the present invention will be described in further detail.

Magnetic Refrigerant Material

First, the present inventors, discoveries relating to the magnetic phase transition of MnAs will be described.

MnAs has a magnetization of about 3.4 $\mu s$ per Mn atom and exhibits a first order phase transition from a ferromagnetic phase into a paramagnetic phase at about 318 K. It is known that this transition is accompanied by a structural phase transformation from an NiAs type hexagonal structure into an MnP type orthorhombic structure. See, for example, C. Guillaud, J. Phys. Radium, 12, 223 (1951). Also, the magnetocaloric effect of MnAs was measured by Kuhrt et al., who reported that its temperature change $\Delta T_{ad}$ in an adiabatic demagnetization process was about 0.2 K against a change in magnetic field strength of about 0.65 T (i.e., about 0.3 K/T). See C. Kuhrt et al., Phys. Stat. Sol. (a)91, 105 (1985). This value of about 0.3 K/T is smaller than that of a typical magnetic refrigerant material (about 2 K/T) by one order of magnitude. Thus, this material has been believed inapplicable as a magnetic refrigerant material.

However, the present inventors paid special attention to the following properties of MnAs. Specifically, the entropy change of MnAs at its Curie temperature, as obtained from the specific heat thereof, is as great as about 4.1 J/Kmol (see, for example, J. W. Schunemann et al., J. Alloys Comp., 178, 237 (1992)). In addition, the magnetic field dependence of the Curie temperature of MnAs is as great as about 3 K/T to about 4 K/T (see, for example, A. Zieba et al., Phys. Lett. 1A, No.5, 243 (1982)). With these unique properties in mind, the present inventors doubted the results of measurement of Kuhrt et al. and measured the variations of magnetization M with temperature T at a number of static magnetic fields by adopting a more precise method.

A sample of MnAs was prepared in the following manner. Specifically, a powder including Mn and As at a one-to-one element ratio was introduced into a quartz tube, which was evacuated and then sealed hermetically. Next, the powder was continuously baked at about 800° C. for about 7 days to allow vapor As to react with powder Mn. Thereafter, the powder was cooled to the vicinity of room temperature to obtain a cake. Subsequently, the cake was pulverized, introduced into the quartz, tube and hermetically sealed there again, and then re-baked at about 800° C. for approximately 7 days on end.

Then, the resultant cake was pulverized and subjected to a powder XRD (Cu-Kα) analysis at approximately room temperature (about 25° C.). As a result, the present inventors identified the cake as MnAs having an NiAs type crystal structure.

Next, using a SQUID magnetization measuring apparatus, the magnetization (M)-temperature (T) curve of MnAs was obtained with a magnetic field having a constant strength applied thereto. The field strength was changed from about 0 T (tesla) to about 5 T (tesla) at regular intervals of about 0.1 T. Based on the results of measurement, the magnetic entropy change $\Delta S_{mag}$ between the applied magnetic fields of 0 and H was calculated by the following Equation (1):

$$\Delta S_{mag} = \int_0^H (\partial M/\partial T)_H dH \quad (1)$$

where $\Delta S_{mag}$ is magnetic entropy change, H is magnetic field, M is magnetization and T is absolute temperature.

Also, an in-field entropy $S_H$ was derived from an entropy $S_{H=0}$ at zero magnetic field, which had been obtained from the specific. heat, and $\Delta S_{mag}$, which had been obtained by Equation (1). By using the in-field entropy $S_H$, the adiabatic temperature change $\Delta T_{ad}$ was calculated.

Figure 2:
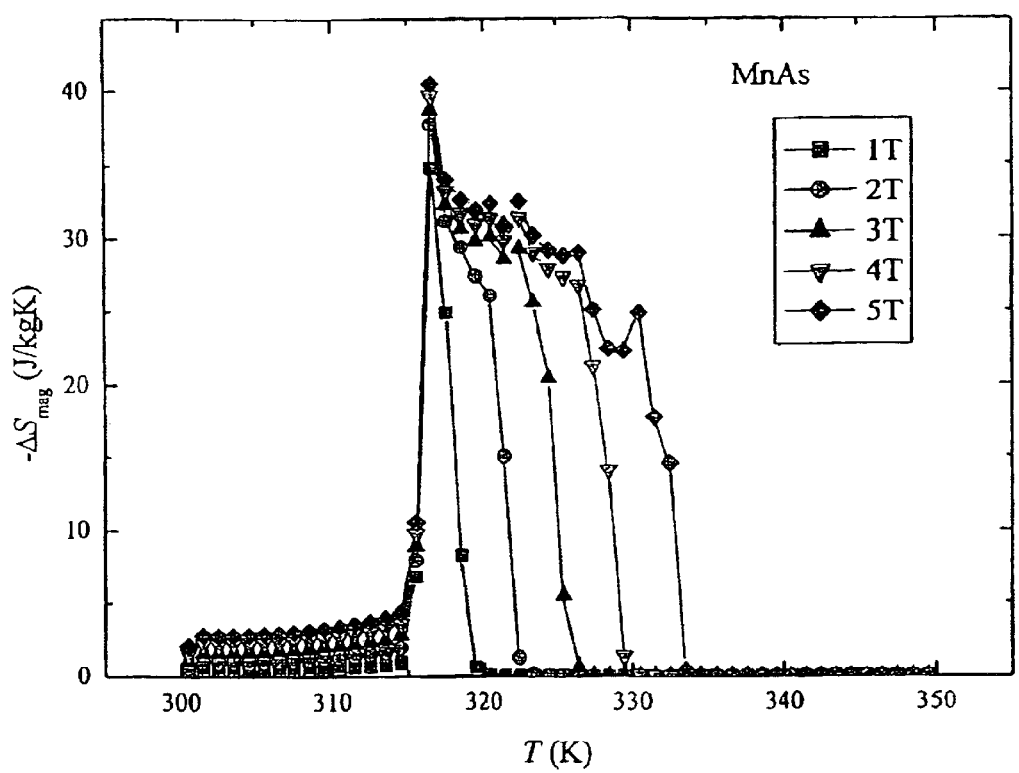
FIG. 2 is a graph showing the temperature dependences of the magnetic entropy changes $\Delta S_{mag}$ of MnAs.
Figure 3:
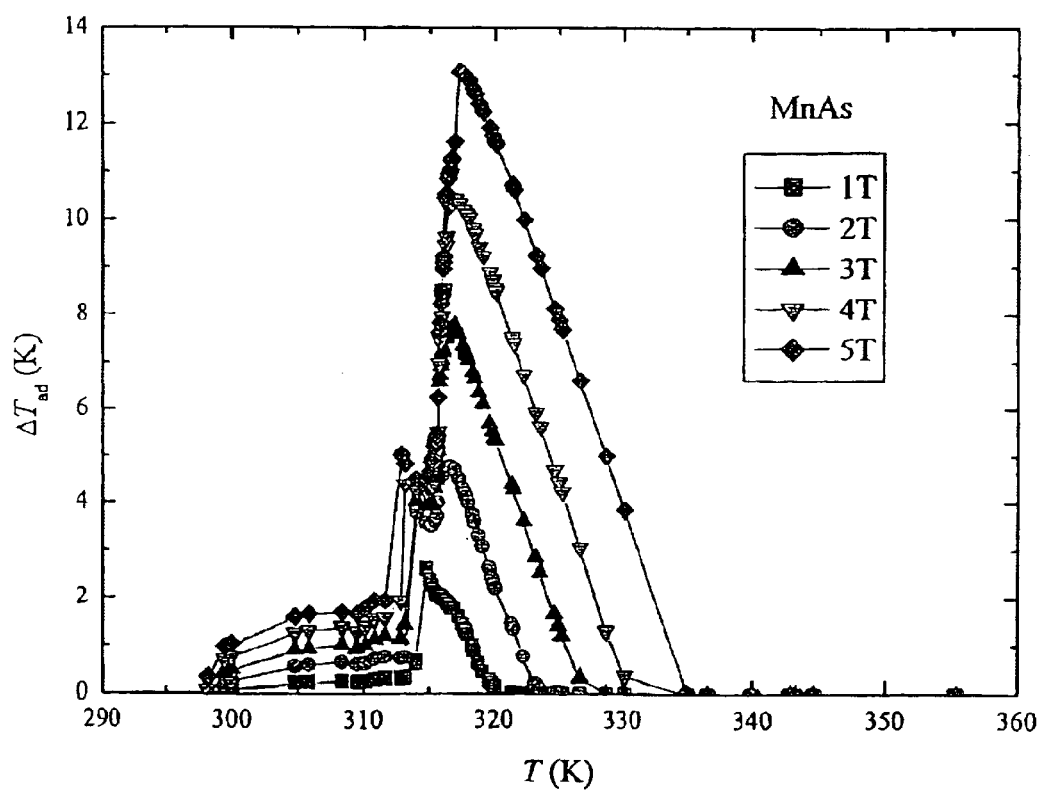
FIG. 3 is a graph showing the temperature dependences of the adiabatic temperature changes $\Delta T_{ad}$ of MnAs.

FIG. 1 shows an exemplary M-T curve obtained in this manner. FIG. 2 shows the temperature dependences of $\Delta S_{mag}$. And FIG. 3 shows the temperature dependences of $\Delta T_{ad}$. It should be noted that FIG. 1 also shows the M-T curves of $MnAs_{1-x}Sb_x$ (where x=0.05 and 0.10) to be described later.

Based on these results, the present inventors discovered that the magnetic entropy change $\Delta S_{mag}$ of MnAs, obtained by Equation (1), was as great as about 42 J/kg.K and that the adiabatic temperature change $\Delta T_{ad}$ at about 5 T (tesla) would be about 13 K.

As can be seen, MnAs exhibits its magnetic phase transition and an extremely large magnetocaloric effect at or near room temperature. Thus, MnAs was thought to be usable as a magnetic refrigerant material for a regenerator that operates at or near room temperature. However, the present inventors noticed that MnAs has significant temperature hysteresis as indicated by the M-T curve shown in FIG. 1.

Next, $MnAs_{1-x}Sb_x$ (where $0<x\leq0.4$) was made by substituting Sb for a portion of As in MnAs and the magnetic phase transition characteristics thereof were analyzed.

A sample of $MnAs_{1-x}Sb_x$ was prepared by a method similar to that used to prepare MnAs. Specifically, powders of Mn, As and Sb were weighed so as to satisfy a predetermined composition and then the mixture was introduced into a quartz tube, which was evacuated and then sealed hermetically. Next, the mixture was continuously baked at about 800° C. for about 7 days to allow vapor As to react with powder Mn and powder Sb. Thereafter, the powder was cooled to approximately room temperature to obtain a cake. Subsequently, the cake was pulverized, introduced into the quartz tube, hermetically sealed there again, and then re-baked at about 800° C. continuously for approximately 7 days.

Then, the resultant cake was pulverized and subjected to a powder XRD (Cu-Kα) analysis at approximately room temperature (about 25° C.). As a result, the resultant cake was identified as $MnAs_{1-x}Sb_x$ having the predetermined composition and an NiAs type crystal structure.

Also, the magnetization (M)-temperature (T) curve, the magnetic entropy change $\Delta S_{mag}$ and the adiabatic temperature change $\Delta T_{ad}$ of this $MnAs_{1-x}Sb_x$ were obtained by respective methods similar to those used for MnAs.

As can be seen from the M-T curve of $MnAs_{1-x}Sb_x$ (where x=0.05 and 0.10) shown in FIG. 1, the Curie temperature decreases when Sb is substituted for a portion of As. For example, the Curie temperature decreases by about 35 K before x reaches 0.10.

It can also be seen that by substituting Sb for a portion of As, the temperature hysteresis decreases. As shown in FIG. 1, the temperature hysteresis has substantially disappeared from the sample of $MnAs_{0.95}Sb_{0.05}$ and is absent almost completely from the sample of $MnAs_{0.90}Sb_{0.10}$. This is because the magnetic phase transition of MnAs is a first order phase transition with a structural transformation, whereas that of $MnAs_{1-x}Sb_x$, obtained by substituting Sb for a portion of As in MnAs, is a second order phase transition without a structural transformation. Accordingly, when Sb is substituted for a portion of As, the hysteresis can be reduced. Specifically, if $x\geq0.015$, the hysteresis is reducible to a practical level. To suppress the hysteresis sufficiently, x is preferably equal to or greater than about 0.05, and more preferably equal to or greater than about 0.10. However, since the Curie temperature decreases as x increases, it is necessary to select an appropriate x range for Sb in accordance with the applicable temperature range.

Figure 4:
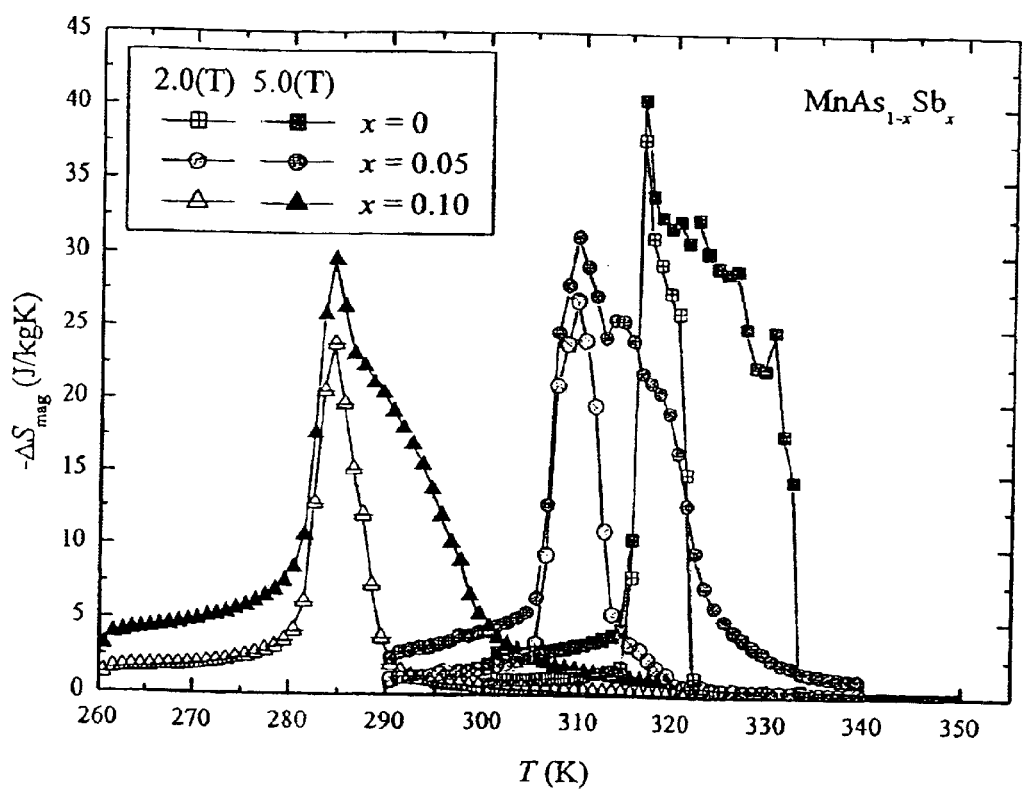
FIG. 4, is a graph showing the temperature dependences of the magnetic entropy changes $\Delta S_{mag}$ of MnAs and MnAs$_{1-x}$Sb$_x$ (where x=0.05 and 0.10).
Figure 5:
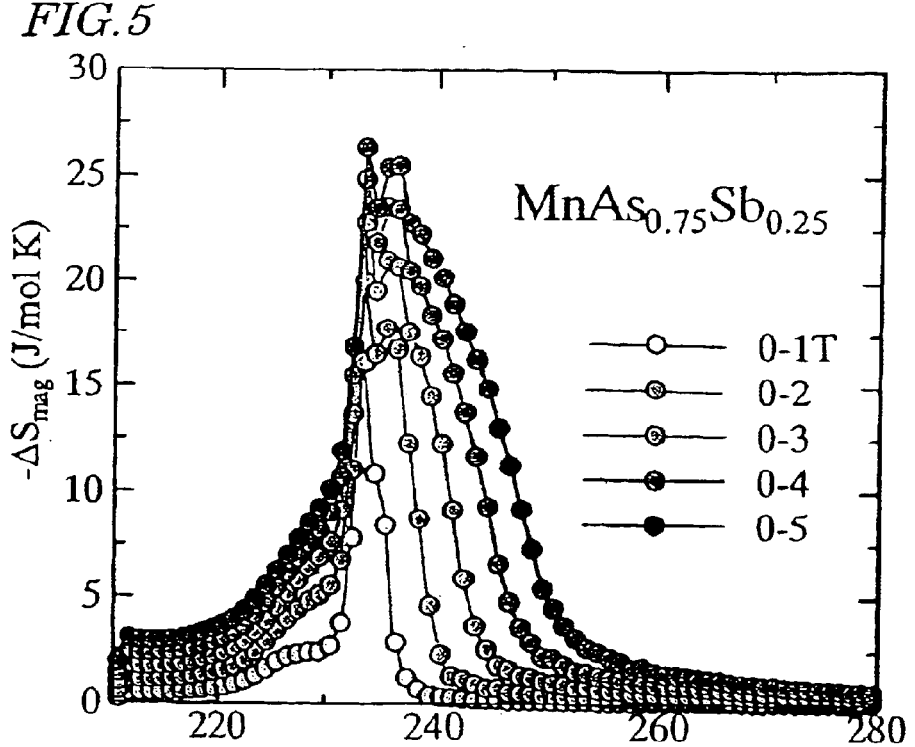
FIG. 5 is a graph showing the temperature dependences of the magnetic entropy changes $\Delta S_{mag}$ or MnAs$_{0.75}$Sb$_{0.25}$.

Also, as can be seen from the temperature dependences of the magnetic entropy change $\Delta S_{smag}$ of $MnAs_{1-x}Sb_x$ (where x=0, 0.05 and 0.10) shown in FIG. 4, $MnAs_{1-x}Sb_x$ (where x=0.05 and 0.10) exhibits a magnetic phase transition without undergoing a structural transformation and yet exhibits sufficiently great magnetocaloric effect, which is smaller than that of MnAs (where x=0), though. Furthermore, as can be seen from the temperature dependences of the magnetic entropy change $\Delta S_{mag}$ of $MnAs_{1-x}Sb_x$ (where x=0.25) shown in FIG. 5, sufficiently great magnetocaloric effect is still achieved even when the mole fraction x of the substituent Sb is equal to about 0.25. Also, considering how the magnetic field strength influences the temperature dependence of the magnetic entropy change $\Delta S_{mag}$ of $MnAs_{1-x}Sb_x$ (where x=0.25), it can be seen that sufficiently great magnetocaloric effect is still achieved even at a field strength of about 4 T or less.

Figure 6:
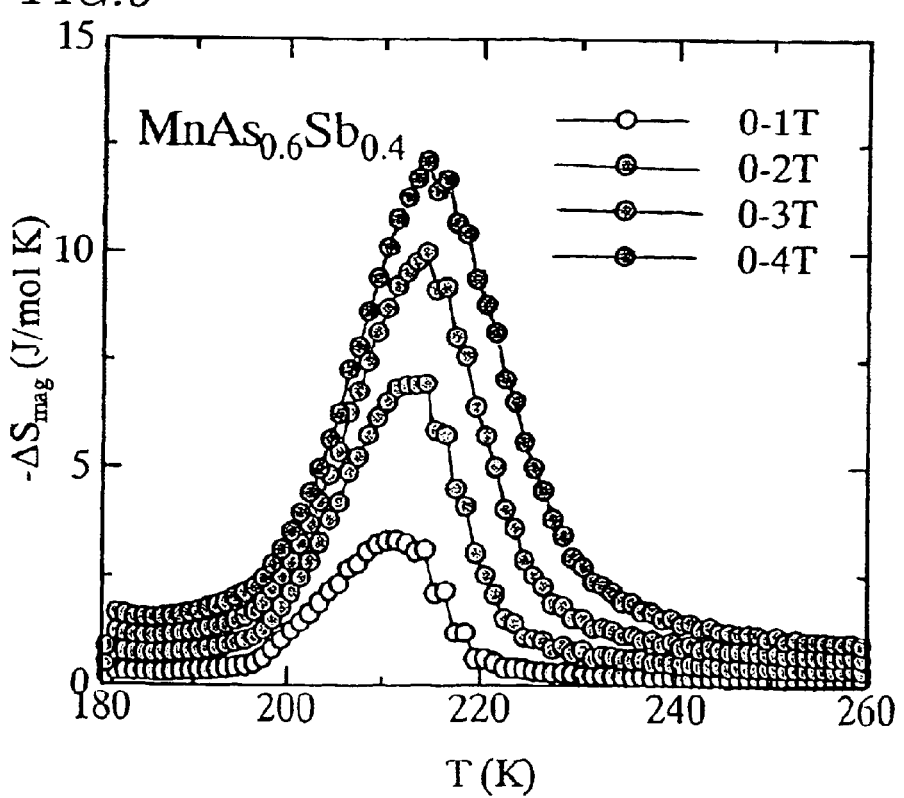
FIG. 6 is a graph showing the temperature dependences of the magnetic entropy changes $\Delta S_{mag}$ of MnAs$_{0.6}$Sb$_{0.4}$.

However, when the mole fraction x of the substituent Sb further increases to reach approximately 0.4, the magnetocaloric effect realized by $MnAs_{1-x}Sb_x$ (where x=0.4 ) is much smaller than that realized by a sample of $MnAs_{1-x}Sb_x$ (where $x\leq0.25$, see FIG. 5, for example) as can be seen from the temperature dependences of the magnetic entropy change $\Delta S_{smag}$ of $MnAs_{1-x}Sb_x$ (where x=0.4) shown in FIG. 6. Accordingly, to achieve sufficiently great magnetocaloric effect, the mole fraction x of the substituent Sb is preferably equal to or smaller than about 0.25. However, depending on its intended application, even $MnAs_{1-x}Sb_x$ (where $x\leq0.3$) could be still usable as a magnetic refrigerant material.

Figure 7:
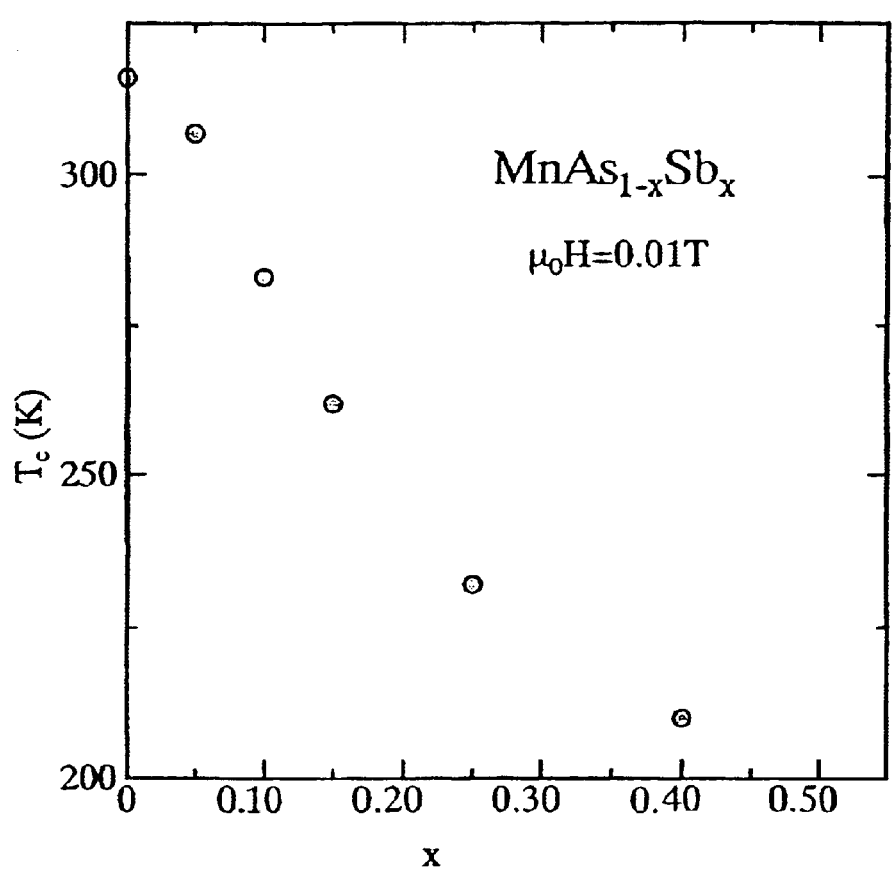

Based on these results, the present inventors discovered that an NiAs type $MnAs_{1-x}Sb_x$ (where x>0) is a material that makes a significant magnetic entropy change near or at room temperature. Also, as shown in FIG. 7, the greater the mole fraction x of the substituent Sb, the lower the Curie temperature of $MnAs_{1-x}Sb_x$. That is to say, the present inventors discovered that by preparing multiple magnetic refrigerant materials from $MnAs_{1-x}Sb_x$ having mutually different x mole fractions of Sb and using those materials in combination, a regenerative bed, which can operate in a sufficiently broad temperature range while maintaining high magnetic field sensitivity, is provided. It should be noted that to realize sufficiently great magnetocaloric effect, the mole fraction x of the substituent Sb is preferably equal to or smaller than about 0.3, and more preferably equal to or smaller than about 0.25.

Next, a magnetic refrigerator, including a regenerator that uses the magnetic refrigerant material according to preferred embodiments of the present invention, will be described.

Figure 8:
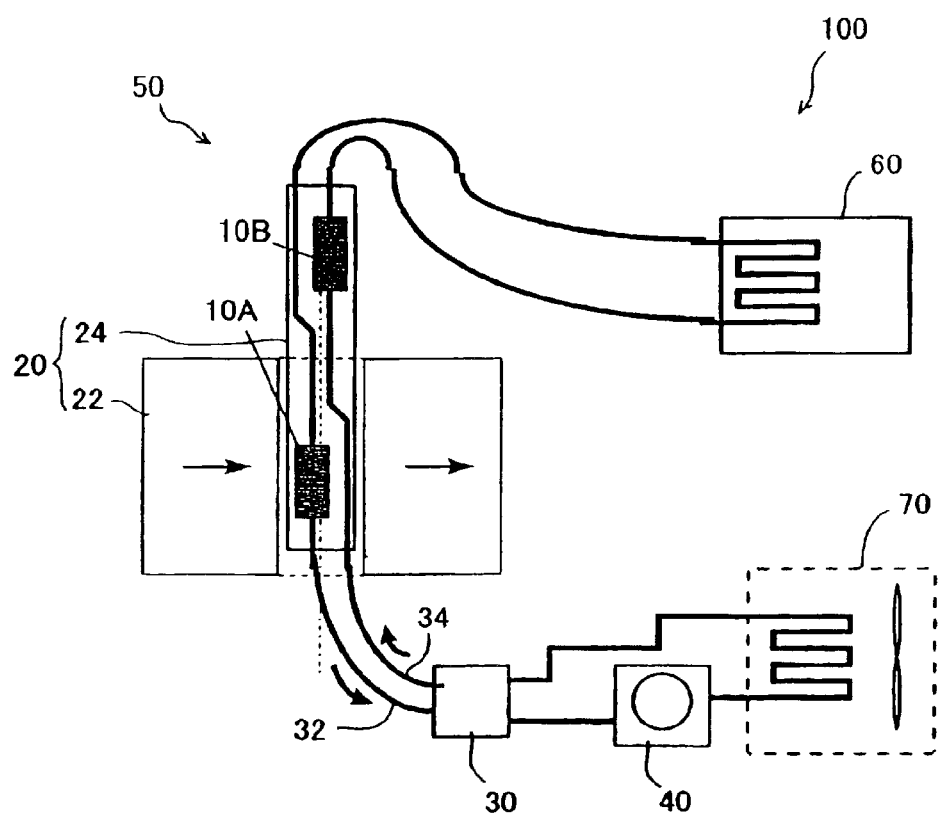
FIG. 8 is a schematic representation illustrating a configuration for a magnetic refrigerator 100 according to a preferred embodiment of the present invention.

FIG. 8 schematically illustrates a configuration for a magnetic refrigerator 100 according to a specific preferred embodiment of the present invention.

The magnetic refrigerator 100 preferably includes a regenerator 50 and cold-side and hot-side heat exchangers 60 and 70 that are thermally coupled to the regenerator 50. The cold-side heat exchanger 60 functions as a refrigerating section, while the hot-side heat exchanger 70 functions as a heat exhausting section.

The regenerator 50 preferably includes first and second regenerative beds 10A and 10B, each including the magnetic refrigerant material, and a mechanism 20 for applying mutually different magnetic fields to the first and second regenerative beds 10A and 10B. The cold-side and hot-side heat exchangers 60 and 70 are thermally coupled to the first and second regenerative beds 10A and 10B by way of heat exchange tubes 32 and 34, through which a heat transfer fluid flows. The flow of the heat transfer fluid is produced by a pump 40 and the flow direction thereof is switched by a channel switch 30.

The mechanism 20 for applying the magnetic fields preferably includes a magnetic circuit 22 including a permanent magnet, and a movable mechanism 24 for shuttling the first and second regenerative beds 10A and 10B back and forth between a position inside the magnetic field generated by the magnetic circuit 22 and a position outside of the magnetic field. The permanent magnet (e.g., neodymium magnet) included in the magnetic circuit 22 may generate a static magnetic field having a strength of about 1 T to about 4 T in the direction shown by the arrows in FIG. 8, for example. The movable mechanism 24 is preferably driven by a linear motor (not shown) and controlled synchronously with the operation of the channel switch 30.

The channel switch 30 switches the channels such that the heat transfer fluid flows from the regenerative bed inside the magnetic field (e.g., the first regenerative bed 10A in the example illustrated in FIG. 8) toward the hot-side heat exchanger 70 and from the regenerative bed outside of the magnetic field (e.g., the second regenerative bed 10B in the example illustrated in FIG. 8) toward the cold-side heat exchanger 60. By operating the movable mechanism 24 from the state shown in FIG. 8, the second regenerative bed 10B will soon fall to a position inside the magnetic field and the first regenerative bed 10A will soon rise to a position outside of the magnetic field. In such a state, the flow of the heat transfer fluid will be reversed to the directions that are opposite to the directions shown by the arrows in FIG. 8. A magnetic refrigerator 100 like this is implementable in accordance with the configuration disclosed in U.S. Pat. No. 5,934,078 identified above.

As the magnetic refrigerant materials included in the first and second regenerative beds 10A and 10B, powder particles, obtained by pulverizing the $MnAs_{1-x}Sb_x$ (where $0<x\leq0.25$) to a diameter of about 0.5 mm, may be used. An approximately 4:1 mixture of pure water and ethanol may be used as the heat transfer fluid. The heat exchange tubes 32 and 34 and the movable mechanism 24 may be made of a reinforced composite plastic such as FRP or other suitable material.

In the magnetic refrigerator 100 according to this preferred embodiment of the present invention, the regenerator 50 uses $MnAs_{1-x}Sb_x$ (where $0<x\leq0.25$) as the magnetic refrigerant material, and therefore operates at or near room temperature and achieves very high energy efficiency. In addition, the regenerator 50 receives a magnetic field generated by the magnetic circuit 22 including a permanent magnet. Accordingly, compared to a conventional magnetic refrigerator using a superconducting magnet, this magnetic refrigerator can save much more energy and can have a much smaller size.

Figure 9:
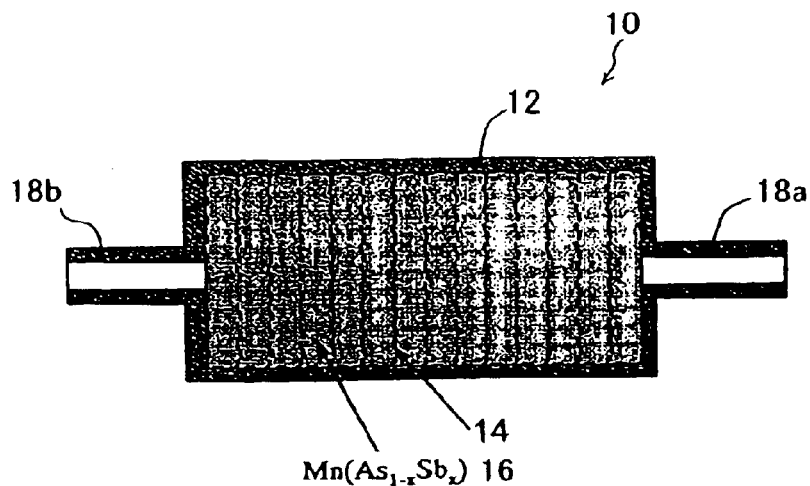
FIG. 9 is a schematic representation illustrating a configuration for a regenerative bed for use in the magnetic refrigerator 100 of FIG. 8.

Next, an exemplary regenerative bed 10, including the magnetic refrigerant material according to preferred embodiments of the present invention, will be described with reference to FIG. 9. This regenerative bed 10 may be used suitably as the first and second regenerative beds 10A and 10B of the magnetic refrigerator 100 shown in FIG. 8.

The regenerative bed 10 preferably includes a container (e.g., cylinder) 12, a plurality of magnetic refrigerant material layers 16 stored inside the container 12, and meshes 14, each of which is provided between one of the magnetic refrigerant material layers 16 and the container 12 or between adjacent ones of the magnetic refrigerant material layers 16. The container 12 includes heat transfer fluid inlet/outlet ports 18a and 18b, which may be connected to the heat exchange tube 32 or 34 shown in FIG. 8, for example. The container 12 is preferably made of a highly adiathermanous material (e.g., porous resin) or other suitable material.

The magnetic refrigerant material layers 16 may be formed in the following manner. First, fourteen types of cakes having mutually different Curie temperatures are made of the same number of $MnAs_{1-x}Sb_x$ materials (where x=0.015, 0.03, 0.06, 0.07, 0.08, 0.09, 0.10, 0.11, 0.12, 0.13, 0.14, 0.15, 0.16 and 0.17, respectively) by the technique described above. Next, these cakes are pulverized to obtain fourteen types of powders with a diameter of about 0.3 mm.

Subsequently, these powders of magnetic refrigerant materials are packed into the container 12 having an inside diameter of about 25 mm and an inside depth of about 70 mm so that each of the layers 16 has a thickness of about 5 mm. The fourteen types of magnetic refrigerant materials are introduced (i.e., the respective magnetic refrigerant material layers 16 are stacked) so that the mole fraction x increases upward in the ascending order (i.e., so that the Curie temperature decreases upward in the descending order). That is to say, the magnetic refrigerant material with the lowest mole fraction x of 0.015 is introduced first, the material with the second lowest x mole fraction of 0.03 next and the material with the highest x of 0.16 last. Also, a mesh of nylon is sandwiched between adjacent ones of the layers 16. In this manner, the fourteen magnetic refrigerant material layers 16 having mutually different Curie temperatures are stacked one upon another so that the Curie temperature decreases upward. Accordingly, the total thickness of the magnetic refrigerant material layers 16 becomes about 70 mm. This stacking direction is defined to be substantially parallel or antiparallel to the direction in which the heat transfer fluid flows through the container 12. When this regenerative bed 10 is used as each of the first and second regenerative beds 10A and 10B of the magnetic refrigerator 100 shown in FIG. 8, the magnetic refrigerant material layers 16 should be stacked in the same order in the regenerative beds 10A and 10B with respect to the magnetic field. That is to say, the mole fraction x or the Curie temperature should increase or decrease in the same order in both of these regenerative beds 10A and 10B.

Figure 10:
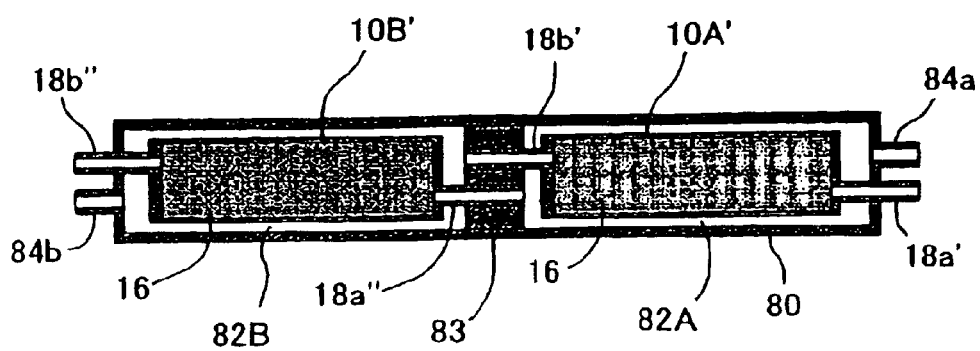
FIG. 10 is a schematic representation illustrating an exemplary arrangement of two regenerative beds for use in the magnetic refrigerator 100 of FIG. 8.

The heat exchange section of the magnetic refrigerator 100, including the regenerative bed 10A or 10B, may be configured by using the regenerative bed 10 as shown in FIG. 10, for example. The container 80 shown in FIG. 10 includes cells 82A and 82B for respectively storing two regenerative beds 10A', and 10B', each of which is implemented as the regenerative bed 10, in a thermally insulated state. The cells 82A and 82B are separated from each other by a partition 83. The gap between the regenerative bed 10A' and the inner walls of the cell 82A and the gap between the regenerative bed 10B' and the inner walls of the cell 82B are filled with a heat transfer fluid that flows between heat transfer fluid inlet/outlet ports 84a and 84b. The regenerative beds 10A' and 10B' are disposed in such a manner that the Curie temperature changes in the same direction in both sets of magnetic refrigerant material layers 16 of the regenerative beds 10A' and 10B'. The outer walls of the regenerative beds 10A' and 10B' have a thermally insulated structure to allow the heat exchange only between the heat transfer fluid, flowing inside the regenerative beds 10A' and 10B', and the magnetic refrigerant material layers 16.

This heat exchange section is constructed to allow the heat transfer fluid to flow in the following two directions. Specifically, the fluid, which has flowed into the regenerative bed 10A' through a heat transfer fluid inlet/outlet port 18a'of the regenerative bed 10A' stored in the cell 82A of the container 80, passes through the regenerative bed 10A' while exchanging heat with the magnetic refrigerant material layers 16. Thereafter, the fluid flows into the cell 82B through another heat transfer fluid inlet/outlet port 18b', and then flows out through the heat transfer fluid inlet/outlet port 84b of the container 80. In the same way, the fluid, which has flowed into the regenerative bed 10B' through a heat transfer fluid inlet/outlet port 18b''of the regenerative bed 10B' stored in the cell 82B of the container 80, passes through the regenerative bed 10B' while exchanging heat with the magnetic refrigerant material layers 16. Thereafter, the fluid flows into the cell 82A through another heat transfer fluid inlet/outlet port 18a''and then flows out through the heat transfer fluid inlet/outlet port 84a of the container 80.

In such a construction, the outer diameter of the container 80, or the circular gap of the magnetic circuit, can be reduced. As a result, the overall size and weight of the magnetic circuit can also be reduced advantageously.

By storing the regenerative beds 10A and 10B of the magnetic refrigerator 100 shown in FIG. 8 in the container 80 as shown in FIG. 10, using Halbach type magnetic circuits (to be described later) with a field strength of about 2 T as the magnetic circuit 22 and applying a (vertical) reciprocating operation with a stroke of about 180 mm performed by the movable mechanism 24 continuously for approximately 40 minutes at about 0.5 Hz, the temperature at the cold-side heat exchanger 60 can be decreased from about 25° C. to about −2° C.

Figure 11:
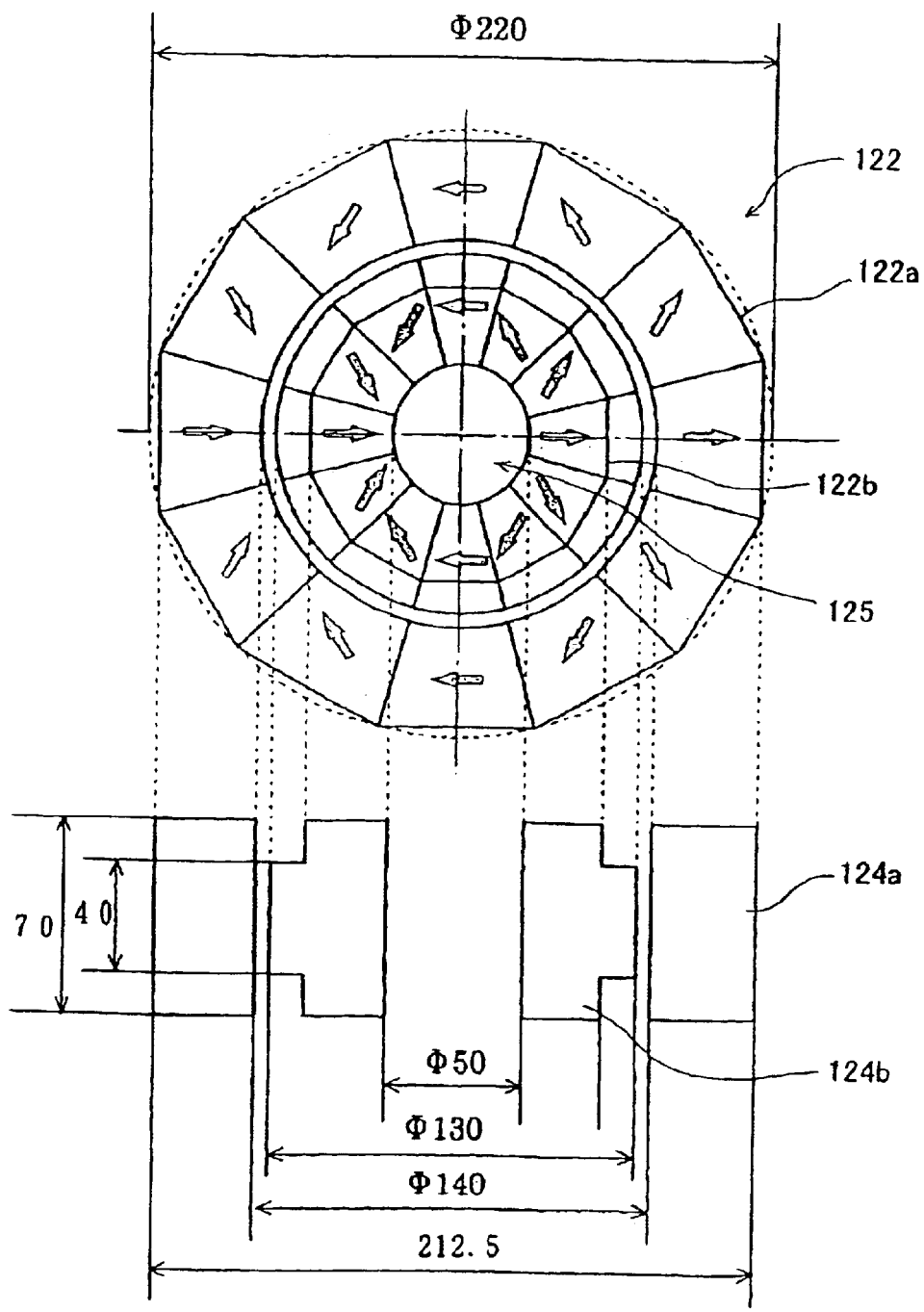
FIG. 11 is a schematic representation illustrating a configuration for a magnetic circuit for use in the magnetic refrigerator 100 of FIG. 8

A known magnetic circuit may be used as the magnetic circuit 22 of the magnetic refrigerator 100. For example, a magnetic circuit 122, including two Halbach type magnetic circuits 122a and 122b as shown in FIG. 11, may be used.

In each of these Halbach type magnetic circuits 122a and 122b, a cylindrical wall thereof is preferably defined by a plurality of permanent magnets 124a or 124b. Each of these Halbach type magnetic circuits 122a and 122b is preferably constructed so that an angle of about $2\alpha$ defined by the magnetization direction of each permanent magnet (as shown by arrows in FIG. 11) with the direction of a magnetic field generated on the center axis of the cylinder is about twice as large as the latitude angle $\alpha$ of a cylinder coordinate representing the position of the magnet inside the substantially cylindrical wall. According to this construction, an unlimitedly strong, uniform magnetic field can be theoretically generated inside each of these cylindrical magnets 122a and 122b vertically relative to the center axis of the cylinder. Actually, though, the maximum possible field strength is limited by the coercivity of the permanent magnet material. Also, to obtain a strong magnetic field, the outer diameter of the cylinder should be increased exponentially with respect to the field strength. Thus, a field strength of several tesla (i.e., about 1 to 4 tesla) is actually realized by this magnetic circuit 122.

No magnetic field exists outside of the Halbach type magnetic circuit 122a or 122b (i.e., outside of the cylinder). Accordingly, if the second Halbach type magnetic circuit 122b is disposed coaxially inside the first Halbach type magnetic circuit 122a, then these two Halbach type magnetic circuits 122a and 122b can be freely rotated. In addition, the cylindrical space 125 of the inner Halbach type magnetic circuit 122b may have its field strength controlled variably.

Accordingly, by using this magnetic circuit 122, mutually different magnetic fields are applicable to the regenerative beds 10A and 10B disposed inside the cylindrical space 125 of the inner Halbach type magnetic circuit 122b without moving the regenerative beds 10A and 10B. Thus, the movable mechanism 24 provided for the magnetic refrigerator 100 shown in FIG. 8 may be omitted in this preferred embodiment. As a result, the efficiency is further improvable advantageously. In this case, either a single regenerative bed or multiple regenerative beds may be disposed inside the cylindrical space 125.

Various preferred embodiments of the present invention described above provide a magnetic refrigerant material that exhibits sufficiently great magnetocaloric effect at or near room temperature. This magnetic refrigerant material exhibits a magnetic phase transition without undergoing a structural transformation, and therefore has no temperature hysteresis. Thus, this working material is effectively applicable to magnetic refrigeration.

In addition, by adjusting the mole fraction of the third element to substitute for a portion of As in MnAs, the Curie temperature of the material is controllable so as to fall within a range from about 230 K to less than about 318 K. Accordingly, by using multiple magnetic refrigerant materials having mutually different Curie temperatures in combination, a regenerator and a magnetic refrigerator, which can operate in a broad temperature range including at or near room temperature, are provided.

Furthermore, the magnetic refrigerant material according to preferred embodiments of the present invention exhibits sufficiently great magnetocaloric effect on the application of a relatively low magnetic field of about 4 T or less. Thus, this novel magnetic refrigerant material is highly applicable to a regenerator and a magnetic refrigerator using a permanent magnet. These apparatuses need no electric power to generate a magnetic field, thus reducing the energy consumption and contributing to significant reductions in size, advantageously.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A magnetic refrigerant material having an NiAs type hexagonal structure in a ferromagnetic phase, comprising a first element Mn, a second element As and a third element to substitute for a portion of the second element, and exhibiting a magnetic phase transition in a temperature range from about 230 K to less than about 318 K.

2. The material of claim 1, wherein the third element is Sb.

3. The material of claim 2, wherein the material is represented by the general formula $MnAs_{1-x}Sb_x$ (where $0<x\leq0.25$) and exhibits the magnetic phase transition into the ferromagnetic phase substantially without undergoing a structural transformation when a magnetic field is applied to the material in a paramagnetic phase.

4. The material of claim 3, wherein the material exhibits the magnetic phase transition on the application of a magnetic field of about 4 Tesla or less.

5. The material of claim 3, wherein x is equal to or greater than about 0.015.

6. The material of claim 3, wherein x is equal to or greater than about 0.05.

7. The material of claim 1, wherein the material includes a fourth element.

8. A regenerator comprising:
   first and second regenerative beds, each including a magnetic refrigerant material having an NiAs type hexagonal structure in a ferromagnetic phase, comprising a first element Mn, a second element As and a third element to substitute for a portion of the second element, and exhibiting a magnetic phase transition in a temperature range from about 230 K to less than about 318 K; and
   a mechanism for applying mutually different magnetic fields to the first and second regenerative beds.

9. The regenerator of claim 8, wherein each of the first and second regenerative beds comprises a plurality of magnetic refrigerant materials that exhibit the magnetic phase transition at respectively different temperatures.

10. The regenerator of claim 9, wherein the magnetic refrigerant materials comprise multiple layers that are stacked one upon another.

11. The regenerator of claim 8, wherein each of the first and second regenerative beds comprises the magnetic refrigerant material and a binder, and wherein the binder is Al, Cu or Ti or a mixture or alloy that includes two or more elements selected from the group consisting of Al, Cu and Ti.

12. The regenerator of claim 8, wherein the mechanism for applying the magnetic fields comprises a magnetic circuit including a permanent magnet.

13. The regenerator of claim 12, wherein the magnetic circuit variably controls the strengths of the magnetic fields to be applied to the first and second regenerative beds.

14. The regenerator of claim 13, further comprising a mechanism for shuttling the first and second regenerative beds back and forth between a first position, which is inside the magnetic field created by the permanent magnet, and a second position, which is outside of the magnetic field, thereby applying the mutually different magnetic fields to the first and second regenerative beds.

15. A regenerator comprising:
   a magnetic circuit for variably controlling the strength of a magnetic field generated therefrom inside a cylindrical space; and
   a regenerative bed, which is disposed and fixed inside the cylindrical space and includes a magnetic refrigerant material having an NiAs type hexagonal structure in a ferromagnetic phase, comprising a first element Mn, a second element As and a third element to substitute for a portion of the second element, and exhibiting a magnetic phase transition in a temperature range from about 230 K to less than about 318 K.

16. A magnetic refrigerator comprising:
   a regenerator including:
      first and second regenerative beds, each including a magnetic refrigerant material having an NiAs type hexagonal structure in a ferromagnetic phase, comprising a first element Mn, a second element As and a third element to substitute for a portion of the second element, and exhibiting a magnetic phase transition in a temperature range from about 230 K to less than about 318 K; and
      a mechanism for applying mutually different magnetic fields to the first and second regenerative beds; and
   a cold-side heat exchanger and a hot-side heat exchanger that are thermally coupled to the regenerator.

* * * * *

UNITED STATES PATENT AND TRADEMARK OFFICE
CERTIFICATE OF CORRECTION

PATENT NO. : 6,826,915 B2
DATED : December 7, 2004
INVENTOR(S) : Hirofumi Wada and Satoshi Hirosawa It is certified that error appears in the above-identified patent and that said Letters Patent is hereby corrected as shown below:

Title page,
Item [73], Assignee, "Meomax" should read -- Neomax Co., Ltd., and "Okada" should read -- Osaka (JP) --

Signed and Sealed this

Thirty-first Day of May, 2005

JON W. DUDAS
*Director of the United States Patent and Trademark Office*